United States Patent
Arhab

(10) Patent No.: US 6,712,186 B1
(45) Date of Patent: Mar. 30, 2004

(54) COMPACT HYDROKINETIC COUPLING APPARATUS, ESPECIALLY FOR A MOTOR VEHICLE

(75) Inventor: Rabah Arhab, Saint-Brice-Sous-Foret (FR)

(73) Assignee: Valeo, Paris (FR)

( * ) Notice: Subject to any disclaimer, the term of this patent is extended or adjusted under 35 U.S.C. 154(b) by 0 days.

(21) Appl. No.: 09/623,901

(22) PCT Filed: Jan. 12, 2000

(86) PCT No.: PCT/FR00/00054
§ 371 (c)(1),
(2), (4) Date: Dec. 18, 2001

(30) Foreign Application Priority Data

Jan. 2, 1999 (FR) .............................. 99 00246

(51) Int. Cl.$^7$ .............................................. F16H 45/02
(52) U.S. Cl. .................................................... 192/3.29
(58) Field of Search ............................. 192/3.29, 212, 192/213.1

(56) References Cited

U.S. PATENT DOCUMENTS

| | | | | |
|---|---|---|---|---|
| 3,185,273 A | * | 5/1965 | Smirl .......................... | 192/3.3 |
| 4,347,717 A | * | 9/1982 | Lamarche ................ | 192/213.1 |
| 4,716,998 A | * | 1/1988 | Tsukamoto et al. ...... | 192/213.1 |
| 5,020,647 A | | 6/1991 | Fujimoto et al. | |
| 5,139,122 A | * | 8/1992 | Maeda et al. .............. | 192/3.29 |
| 5,195,621 A | | 3/1993 | Dull et al. | |
| 5,209,330 A | | 5/1993 | Macdonald | |
| 5,407,041 A | | 4/1995 | Fukunaga et al. | |
| 5,590,750 A | | 1/1997 | Graton et al. | |
| 5,813,506 A | * | 9/1998 | Maeda et al. .............. | 192/3.29 |
| 5,964,329 A | * | 10/1999 | Kawaguchi et al. ......... | 192/3.3 |
| 6,193,037 B1 | * | 2/2001 | Middelmann et al. ..... | 192/3.29 |
| 6,264,018 B1 | * | 7/2001 | Matsuoka et al. ......... | 192/3.29 |

FOREIGN PATENT DOCUMENTS

| | | |
|---|---|---|
| DE | 4424989 | 1/1996 |
| DE | 19734678 | 2/1998 |
| FR | 2635845 | 3/1990 |
| FR | 2735846 | 12/1996 |
| JP | 58-131464 A  * | 8/1983 |
| JP | 9-189351 A  * | 7/1997 |
| WO | 9407058 | 3/1994 |

* cited by examiner

Primary Examiner—Rodney H. Bonck
(74) Attorney, Agent, or Firm—Liniak, Berenato & White

(57) ABSTRACT

The invention proposes an apparatus (10) comprising a casing (12, 20, 22) which has a wall (24) arranged to be coupled in rotation to a driving shaft, a turbine wheel (30) rotatable with a hub (34) which is arranged to be coupled in rotation to a driven shaft, a generally radially oriented piston (58) which is movable axially and coupled in rotation to the casing, and an annular friction disc (74), oriented generally radially and carrying two annular friction liners (76) which are adapted to be gripped axially by the piston (58) between, respectively, itself and the inner face (73), in facing relationship with it, of the radial wall (24) of the casing; the friction disc (74) is coupled at its radially inner periphery (94) to the hub (34) of the turbine (30); the piston (58) has means (100) at its radially outer periphery for meshing with a radially outer peripheral portion (26, 102) of the casing (22).

49 Claims, 14 Drawing Sheets

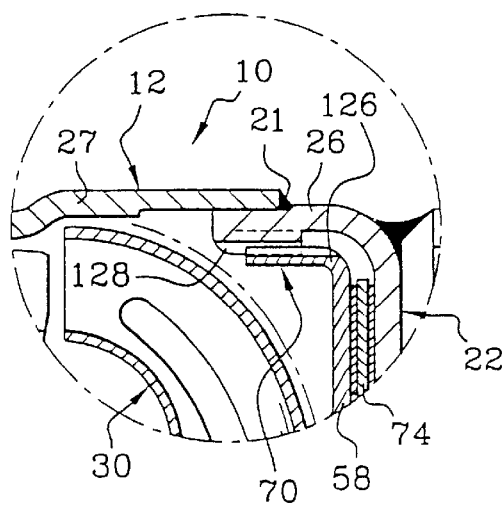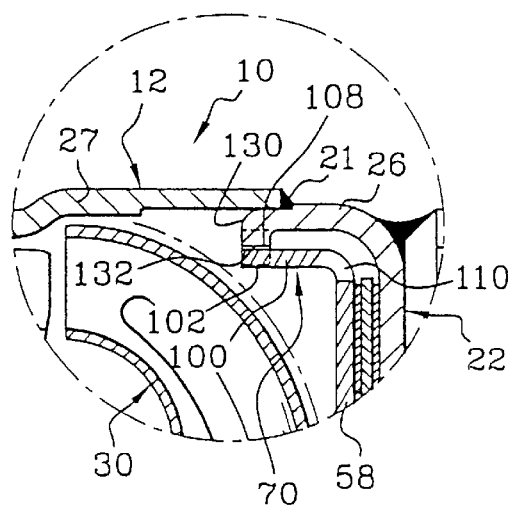
FIG.7　　　　　　　FIG.8
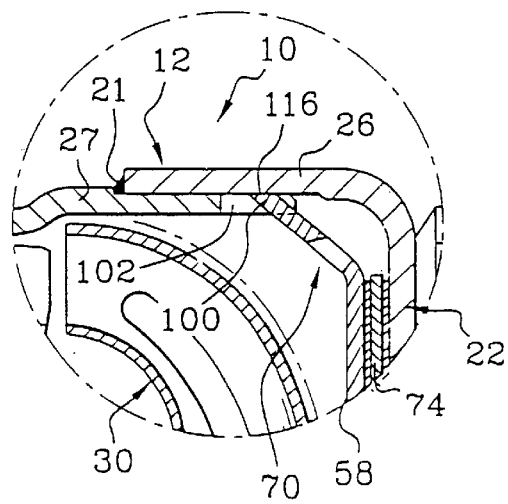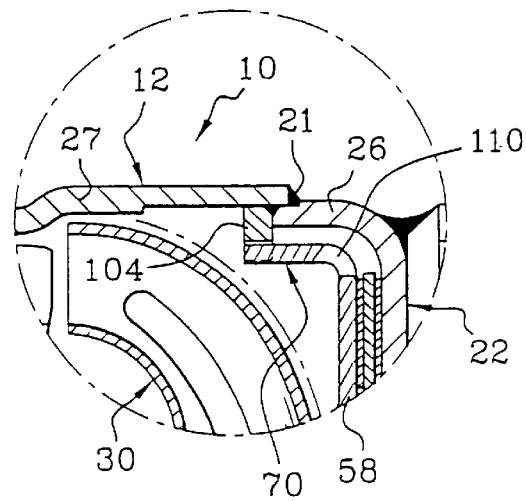
FIG.10　　　　　　　FIG.9

COMPACT HYDROKINETIC COUPLING APPARATUS, ESPECIALLY FOR A MOTOR VEHICLE

The present invention relates to a hydrokinetic coupling apparatus, especially for a motor vehicle, of the type which is described and shown for example in the document WO-A-93/13339 or the document EP-A-0 612 384.

That document describes and shows a hydrokinetic coupling apparatus, especially for a motor vehicle, of the type comprising:

a casing having a generally transversely oriented wall which is adapted to be coupled in rotation to a driving shaft;

a turbine wheel which is fixed in rotation to a hub which is adapted to be coupled in rotation to a driven shaft;

a lock-up clutch interposed operatively between the turbine wheel and the transverse wall which comprises, arranged axially from front to rear between the turbine wheel and the transverse wall:

a damper plate which is fixed to the turbine wheel for rotation therewith and is in the form of a generally transversely oriented annular ring having at its outer periphery a generally axially oriented annular portion which circumferentially guides and retains circumferentially acting resilient members, and which includes generally—transversely oriented zones of engagement for the circumferential ends of the resilient members;

a piston in the form of a flat annular ring, oriented generally transversely, movable axially and coupled in rotation to the casing;

and at least one flat annular friction disc, oriented generally transversely and carrying, on its opposed front and rear faces, two annular friction liners which are arranged to be gripped axially by the piston between, respectively, itself and the internal face of the transverse wall of the casing which is in facing relationship to it, the friction disc including, at its outer periphery, drive lugs which extend axially towards the rear inside the peripheral annular portion of the damper plate, so that each of them is received between the circumferential ends of two consecutive circumferentially acting resilient members, and which is movable axially with respect to the damper plate.

The document FR-A-2 635 845 describes and shows an apparatus of the same type in which a torsion damper is interposed between the hub of the turbine and the piston, while the friction disc is in mesh with the outer periphery of the casing. In that document, the damper is arranged generally radially inwards, radially inward of the central portion of the turbine wheel having the largest axial dimension.

The invention aims to propose an apparatus of the type described above, in which its axial size is reduced and in which the main components are of simple forms, easy to make.

With this in view, the invention proposes hydrokinetic coupling apparatus, in particular for a motor vehicle, of the type comprising:

a casing having a generally radially oriented wall and adapted to be coupled in rotation to a driving shaft;

a turbine wheel coupled in rotation to a hub which is adapted to be coupled in rotation to a driven shaft;

a piston, in the form of a generally radially oriented annular ring movable axially and coupled in rotation to the casing;

and a generally radially oriented annular friction disc adapted to be gripped axially by the piston between, respectively, itself and the facing inner surface of the radial wall of the casing, characterised in that the friction disc is coupled at its radially inner periphery to the hub of the turbine wheel, and in that the piston has means at its radially outer periphery for meshing with a radially outer peripheral portion of the casing.

Thanks to the invention, the friction disc is simplified, and the axial size of the hydrokinetic coupling apparatus is reduced at its outer periphery.

In accordance with further features of the invention:

the turbine wheel, the piston, the friction disc and the radial wall of the casing are arranged in axial succession from front to rear, which enables the turbine and impulse wheels to be given the desired form;

the turbine wheel is coupled in rotation to a stepped hub which comprises a front portion of larger diameter for guiding the radially inner periphery of the piston, and a rear portion of smaller diameter to which the inner periphery of the friction disc is coupled in rotation;

the radially inner periphery of the piston is configured as a sleeve which is guided in sealed sliding movement along the outer periphery of the front portion of the hub of the turbine;

the friction disc is in the form of a flat annular ring, which simplifies its manufacture;

the inner periphery of the friction disc is coupled rigidly to the hub of the turbine;

the friction disc is coupled to the radially inner periphery of the hub of the turbine with a torsion damper interposed, so that the said damper can be relatively thick in the axial direction since it is arranged in the lower or radially inner, part of the apparatus;

the torsion damper includes a damper plate in the form of a flat annular ring which is coupled at its radially inner periphery to the hub of the turbine;

the friction disc and the damper plate are substantially coplanar, so as to give good transmission of forces and good working conditions;

the radially inner periphery of the damper plate is configured as a splined guide sleeve through which the splined rear portion of the hub of the turbine, along which the sleeve is mounted for sliding movement, extends;

the radially inner periphery of the damper plate is coupled axially and in rotation to an internally splined central guide sleeve through which the splined rear portion of the hub of the turbine, along which the sleeve is mounted for sliding movement, extends;

the radially inner periphery of the damper plate is splined internally, and the splined rear portion of the hub of the turbine, along which the damper plate is mounted for sliding movement, extends axially through the latter;

the piston includes, considered radially outwards from the inside, an internal peripheral portion and a bent first intermediate portion which substantially follows the external profile of the hub and the turbine wheel, then an intermediate second portion in the form of a radially oriented flat ring, the rear annular face of which is in facing relationship with a friction ring, and an outer peripheral portion in the form of a generally axially oriented skirt which includes means whereby it can mesh with a radially outer peripheral portion of the casing, so that the turbine wheel can be given a semicircular form in cross section;

the outer peripheral skirt extends axially forward from the second intermediate portion;

the outer peripheral skirt portion is a tubular cylindrical skirt;

the outer peripheral skirt is a frusto-conical skirt;

the piston has fluid passage holes;

the passage holes are formed in the bent junction zone between the intermediate second portion and the outer peripheral skirt;

the passage holes are formed in the outer peripheral skirt;

the radially outer periphery of the casing with which the piston meshes is generally tubular and cylindrical;

the radially outer periphery of the casing delimits an internal cylindrical surface for centring the radially outer periphery of the piston, and the hub of the turbine extends with a radial clearance through the radially inner periphery of the piston;

the piston has a generally radially oriented outer peripheral portion, the cylindrical free edge of which is centred in the internal cylindrical centring surface of the casing;

the outer peripheral skirt portion of the piston includes a set of bosses formed in relief, which extend radially outwards and are centred in the internal cylindrical centring surface of the casing;

the outer peripheral portion of the piston has a set of lugs or splines spaced apart circumferentially and received in complementary notches or splines in the tubular periphery of the casing;

the complementary notches or splines in the tubular periphery of the casing are formed in an annular member which is fixed internally in the casing;

the annular member is a starter crown;

the casing is made as two complementary half shells, namely a front half shell and a rear half shell, each of which includes a portion of the tubular periphery of the casing;

the complementary notches or splines in the tubular periphery of the casing are formed in one of the two portions of the tubular periphery of the casing;

the annular member is fixed within one of the two portions of the tubular periphery of the casing;

the apparatus includes a torsion predamper which is interposed between the turbine hub and the main damper, so as to give improved vibration absorption;

the predamper is radially adjacent and close to the hub;

the predamper is disposed axially between the piston and the main damper;

the predamper is disposed axially between the main damper and the transverse wall, in facing relationship with it, of the casing.

Thanks to the invention, the turbine and impulse wheels may have in cross section either a semicircular or an ovoid form.

The friction disc carries at its radially outer periphery two friction liners on its opposed transverse faces.

Further features and advantages of the invention will appear on a reading of the following detailed description, for an understanding of which, reference will be made to the attached drawings, in which:

FIGS. 7 to 10 are views similar to the upper part of FIG. 1, but show four further embodiments of the means of the invention;

In the following description, components identical or similar or analogous to each other will be designated by the same reference signs.

In order to facilitate the reading of the description and claims, the terms front, rear, upper, lower, vertical, horizontal, and so on will be used in a non-limiting way and with reference to the drawings.

Figure 1:
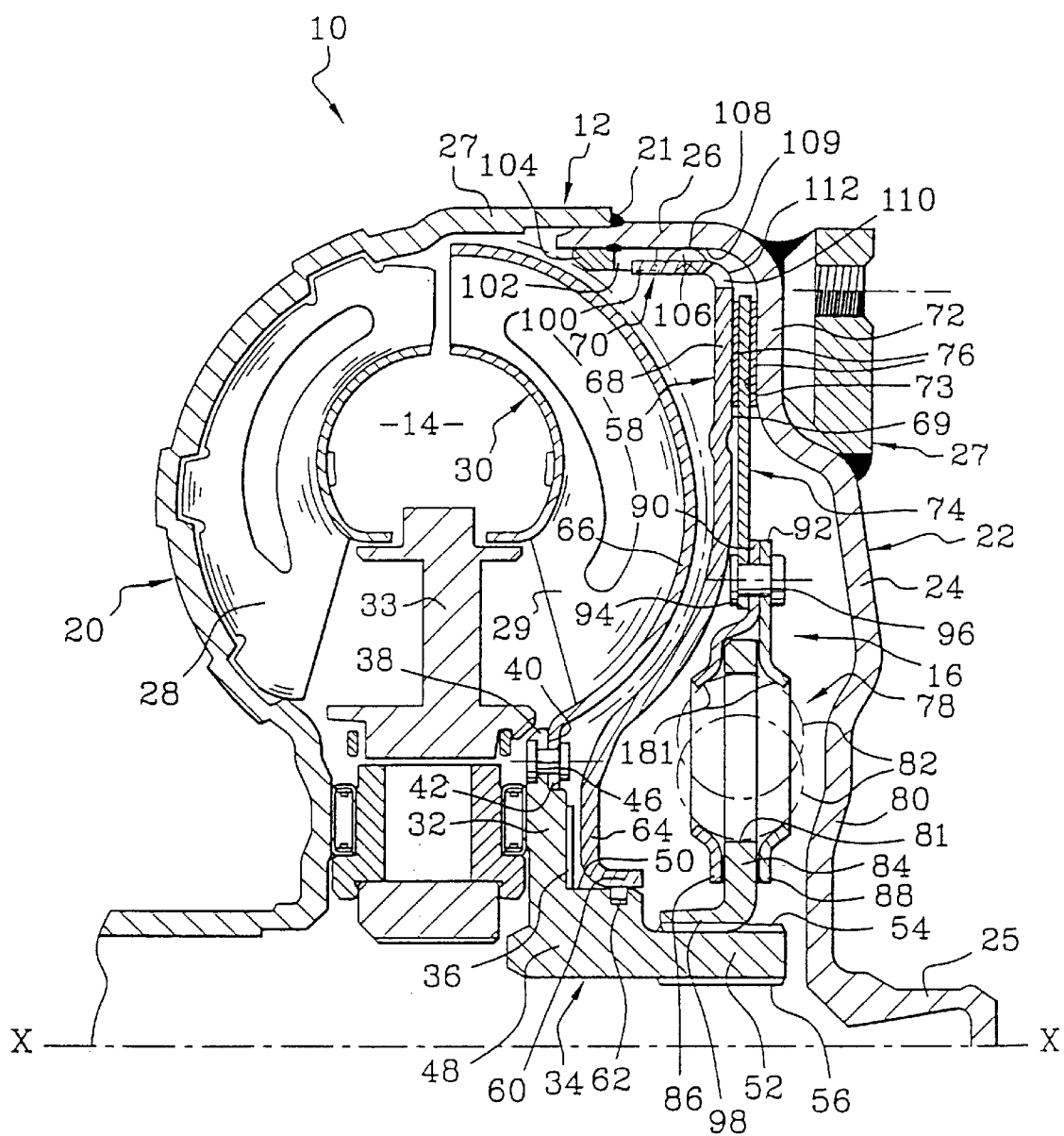
FIG. 1 is a half view in axial cross section of a first embodiment of a coupling apparatus in accordance with the features of the invention.

In a design which is known, for example from the document WO-A-94/07058 to which reference should be made for more detail, FIG. 1 shows a hydrokinetic coupling apparatus 10 which comprises, arranged in a common sealed housing which is filled with oil and constitutes a casing 12, a torque converter 14 and a clutch 16 of the kind conventionally called a lock-up clutch.

The casing 12, which in this example is of metal, is a driving element, and it is arranged to be coupled in rotation to a driving shaft (not shown), namely, for example, the crankshaft of the internal combustion engine in the case of application to a motor vehicle, as is shown in some of the Figures.

The casing 12, the general form of which is annular on an axis X—X, consists of two half shells, namely a front half shell 20 and a rear half shell 22, which are arranged facing each other and are fixed sealingly at their outer periphery, typically by a welding operation 21.

The rear half shell 22 is arranged to be coupled in rotation to the driving shaft, and it consists essentially of a wall 24 in the form of an annular disc which is oriented generally transversely, that is to say it lies in a radial plane at right angles to the axis X—X, which is the axis of symmetry and rotation of the apparatus, which includes a hollow centring element 25, and which is extended at its radially outermost periphery by an axially oriented cylindrical rear tubular wall 26 that extends forward.

The centring element 25 is arranged to cooperate with the driving shaft, while at its outer periphery the disc 24 has nuts 27, one of which can be seen in FIG. 1, for coupling it in rotation with the driving shaft by means of a radial plate which is screwed on the nuts.

The front half shell 20 is so configured as to define an impulse wheel with vanes 28 in the inner face of the said half shell 20.

These vanes 28 lie facing the vanes 29 of a turbine wheel 30 which is secured by riveting in this example or by welding in another version, to a front hub plate 32 which in this case is made integrally in one piece with a hub 34 having internal splines 35 for coupling it in rotation to a driven shaft (not shown), namely the input shaft of the gearbox in the case of application to a motor vehicle. This shaft has a central feed duct which is open in the centring element 25.

Like the rear half shell 22, the front half shell is extended at its outer periphery by an axially oriented cylindrical front tubular wall 27 which extends towards the rear and is received partially, and centred, on the rear tubular wall 26 to which it is welded.

The hub 34 is coaxial with the other elements of the apparatus, and it is extended radially outwards from the front portion of its body which is in the form of a stepped and splined sleeve, by the transversely oriented radial plate 32.

Means, not shown in the drawings, are of course provided for immobilising the hub 34 axially with respect to the casing, these means being for example in the form of a thrust ring fixed on the hub or on the casing.

A member 36 is fixed on the rear transverse face of the plate 32 to constitute an axial abutment member for a front annular end face of the piston of the apparatus. This member 36 is an axial thrust ring for the piston 58 of the apparatus and a hysteresis ring.

The central main portion of the plate 32 is extended radially outwards by an external radial edge portion 38 which comprises an annular flange 40 formed in the rear transverse face of the plate 32.

The transverse base of the flange 38 constitutes a rear axial abutment surface for a radially inner edge of lugs 42 of the turbine wheel 30.

The lugs 42 are part of a series of lugs of the turbine wheel, each of which extends radially inwards in a transverse plane. The lugs 42 in this example are joined together so as to constitute a continuous annular ring.

Rivets 46 pass axially through the lugs 42 and the external radial portion, the thickness of which is reduced by the flange 38 of the plate 32. The hub 34 is generally L-shaped in cross section and it is directed axially towards the wall 24.

There is an axial clearance between the hub 34 and the wall in order to feed from the driven shaft the variable volume chamber which is delimited by the piston 58 and wall 24.

In accordance with one aspect of the invention, the hub 34 is stepped, and it has a front portion 48 of larger diameter which delimits externally a smooth cylindrical surface 50 for guiding the piston 58, and a rear free end portion 52 which is splined on the outside at 54 and on the inside at 56.

In accordance with the features of the invention, the piston 58 is axially adjacent to the turbine wheel 30.

The radially inner periphery of the piston 58 is configured as a sleeve portion 60 which is guided in axial sliding movement sealingly, with an interposed O-ring seal 62, along the outer periphery 50 of the front portion 48 of the hub of the turbine 30.

The piston 58 follows the form of the turbine wheel and includes, considered radially from the inside out, an internal peripheral portion 64 in the form of a flat annular ring, which is extended radially inwards by the sleeve portion 60, and a first rounded and bent intermediate portion 66, which substantially follow, respectively, the outer profile of the hub plate 32 of the hub 34 and the substantially hemispherical profile of the turbine wheel 30, these being followed by a second intermediate portion 68 in the form of a flat annular ring, oriented transversely, and then an outer peripheral portion 70 in the form of a generally axially oriented skirt which extends forward towards the turbine wheel and which is adjacent to the inner face of the tubular wall 26, 27 of the casing 12.

The second intermediate portion 68 of the piston 58, in the form of a flat annular ring, is axially adjacent to the inner face 73 of the outer periphery 72 in the form of a flat annular ring portion of the transverse wall 24 of the casing 12.

A flat annular friction disc 74 is interposed axially between the rear transverse face 69 of the portion 68 of the piston 58 and the inner face 73 of the casing.

In the example shown in the drawings, the outer radial periphery of the friction disc 74 carries on its opposed transverse faces two friction or rubbing discs 76 which are for example adhesively bonded on the corresponding side face, the free surface of each friction liner being either smooth or grooved in accordance with a design which is known from the document PCT-EP 92/02480, in order to permit controlled progressive sliding movement. In another version, the friction liners 78 are fixed on the faces 69, 73. In a further version, one friction liner is provided, and the disc 74 is embedded at its outer radial periphery within the friction liner.

The friction disc 74 is coupled in rotation by an interposed resilient damper 78 to the splined hub 34, 52 of the turbine wheel 30, with respect to which it is displaceable axially so that it can be gripped axially between the piston 58 and the casing 12, 22.

By way of a variant, not shown, and without departing from the scope of the invention, the radially inner periphery of the annular friction ring may be coupled to the hub 34 rigidly for rotation with it, that is to say without any resilient damper.

The damper 78 is disposed radially towards the inside, that is to say close to the axis X—X, radially inward of the central portion of largest axial dimension of the turbine wheel 30, and it is therefore located axially between the radially inner portions 60, 64 and 66 of the piston and the radially inner portion 80, in facing relationship with it, of the transverse wall of the casing 12, thereby reducing both the axial and radial dimensions of the apparatus 10.

Accordingly, for a given axial size of the apparatus, it is possible to increase the size of the wheels 28, 30, and therefore the performance of the apparatus.

The structure of the resilient damper is in general of the known conventional kind, that is to say it comprises coil springs 82 acting circumferentially and being interposed between a central damper plate 84 which is formed with windows 81 that receive the springs, and two guide rings, namely a front guide ring 86 and a rear guide ring 88, which surround the damper plate 84 and the springs 82 with windows 79 for receiving the springs 82, this being in facing relationship with each window 81.

Each ring 86, 88 has transversely oriented lugs 90, 92 which extend radially outwards and which, in this example, are adjacent to each other. The lugs 90 of the front ring 86 are adjacent to the rear transverse face of the inner radial periphery 94 of the friction disc, the guide rings being connected to the friction disc by means of rivets 96 which extend axially through the radially inner, annular, periphery 94 and the lugs 90 and 92.

By way of variation, the lugs 90 and 92 may be in the form of continuous annular portions of the periphery of the rings 86 and 88.

The configuration of the friction disc 74 is particularly simple, and it includes no means for meshing with another component, that is to say no drive lug which would require to be heat treated.

The central damper plate 84 is in the form of a thick flat annular ring, and it is coplanar with the friction disc, thereby ensuring good balancing of the assembly and avoiding the occurrence of parasitic tilting torques while the damper 78 is operating.

In this example, the radially inner periphery of the damper plate 84 is configured, for guiding it in axial sliding movement and coupling it in rotation with the hub 34, 52, as an internally splined sleeve portion 98, through which the rear end portion 52 of the hub extends, and which extends axially forward from the transverse plane in which the central damper plate 84 lies. In a modified version, the sleeve portion 98 is a separate piece, welded or seamed on the damper plate 84.

For coupling it in rotation with the casing 12, the outer periphery of the piston 58 meshes with the tubular wall 26, 27 of the casing, while permitting axial displacements of the piston 58 in both directions with respect to the casing 12.

More precisely, the peripheral skirt portion 70 is divided at its front axial end into a set of axially oriented lugs 100 constituting tenons and being for example spaced apart circumferentially at regular intervals, with each of these lugs being received with a slight circumferential fitting clearance in a complementary slot or notch 102 which constitutes a mortice and which is formed in the rear portion of an angular meshing piece 104 attached internally, in this example by welding, in the rear tubular portion 26 of the casing 12.

The piece 104 can have the desired thickness. The piston 58 is thereby coupled in rotation to the casing 12, while being able to be displaced axially by means of a coupling of the type consisting of the tenons 100 and mortices 102, and with a reduced axial dimension between the outer periphery of the turbine wheel 30 and the outer periphery of the wall 24.

In order to ensure that the piston 58 is centred with respect to the casing 12, the skirt portion 70 includes, between the meshing lugs 100, centring bosses 106 which project radially outwards from the outer cylindrical envelope of the skirt portion 70, these bosses having a flattened outer surface 108 which is received in axial sliding movement and centring relationship within the inner cylindrical wall 109 of the rear tubular portion 26 of the rear half shell 22.

The piston 58 is thereby centred radially on the outside, while the front portion 48 of the hub of the turbine extends with a slight radial clearance through its internal central sleeve portion 60. It will be noted that the piston is thus centred with respect to a component with respect to which it does not turn, and that machining of the portion 50 does not have to be precise. The hub 34 is therefore inexpensive to make.

A set of holes 110 are formed in the bend 112 which joins the portions 68 and 70 of the piston. The holes 110 are to admit oil, which can therefore pass axially between the bosses in the annular zone defined between the mutually facing outer and inner cylindrical envelopes, with a radial clearance between them, of the skirt portion 70 and tubular portion 26 respectively.

In addition, the holes 110 facilitate manufacture of the piston by bending its skirt portion 70, which enables a piston to be obtained which has a constant large thickness and is therefore very rigid. Because of the design in accordance with the invention, the same torque as in the prior art can be transmitted while having a simpler form of friction disc 74.

Figure 2:
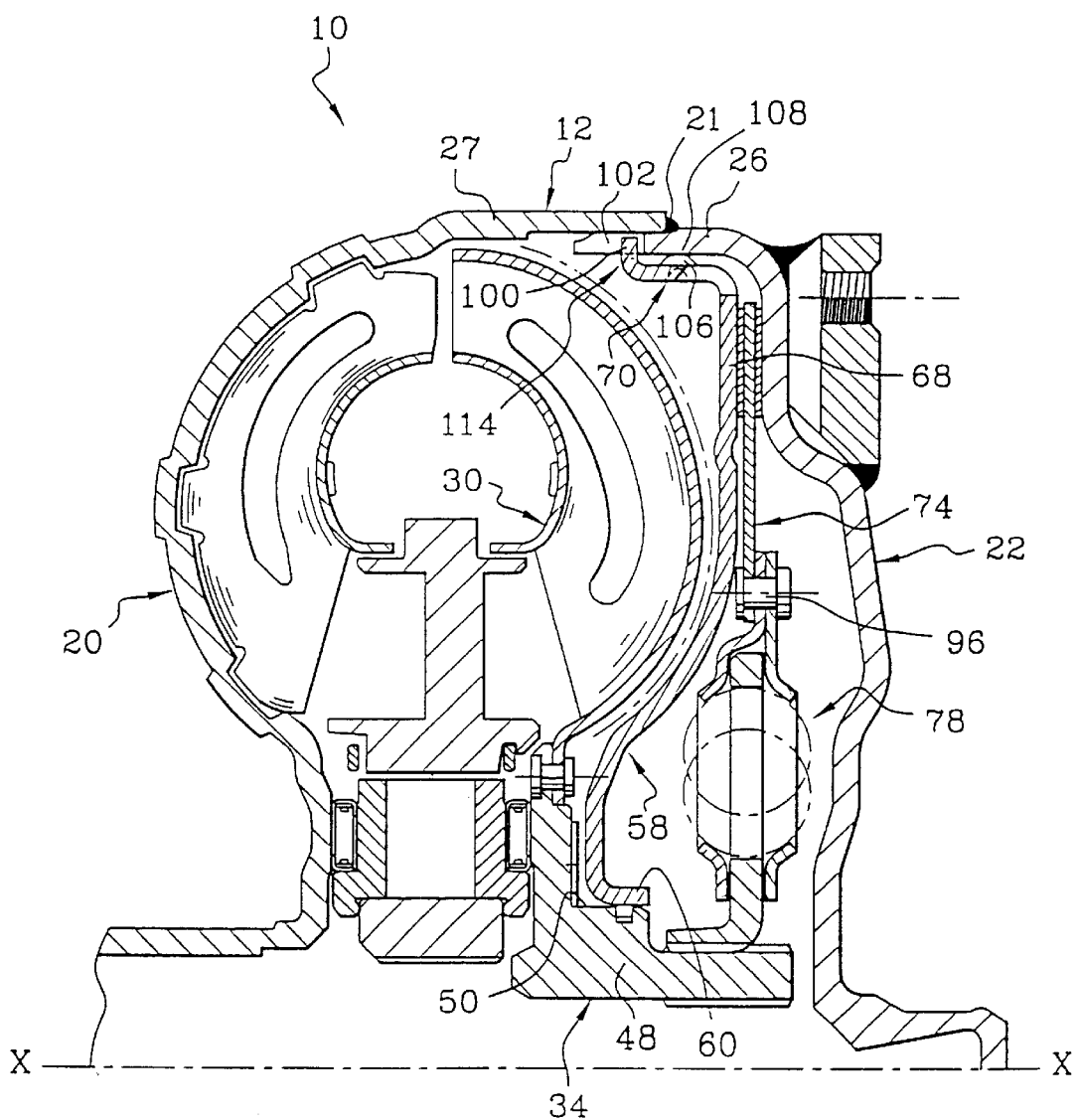
FIGS. 2 to 6 are views similar to those in FIG. 1, showing further embodiments of the invention.

The embodiment shown in FIG. 2 differs from the foregoing in the form of the means whereby the piston 58 meshes with the casing 12.

The outer periphery of the piston is of substantially S-shaped configuration, that is to say the skirt portion 70 is extended at its axial front end by a radially oriented annular ring portion 114 which is divided into meshing lugs 100 constituting tenons that are received radially in complementary notches 102 constituting mortices, which in this example are formed directly in the front axial end portion of the rear tubular portion 26, these notches being closed radially by the front tubular portion 27. The piston 58 is centred by the portion 50, which is machined accordingly.

Figure 3:
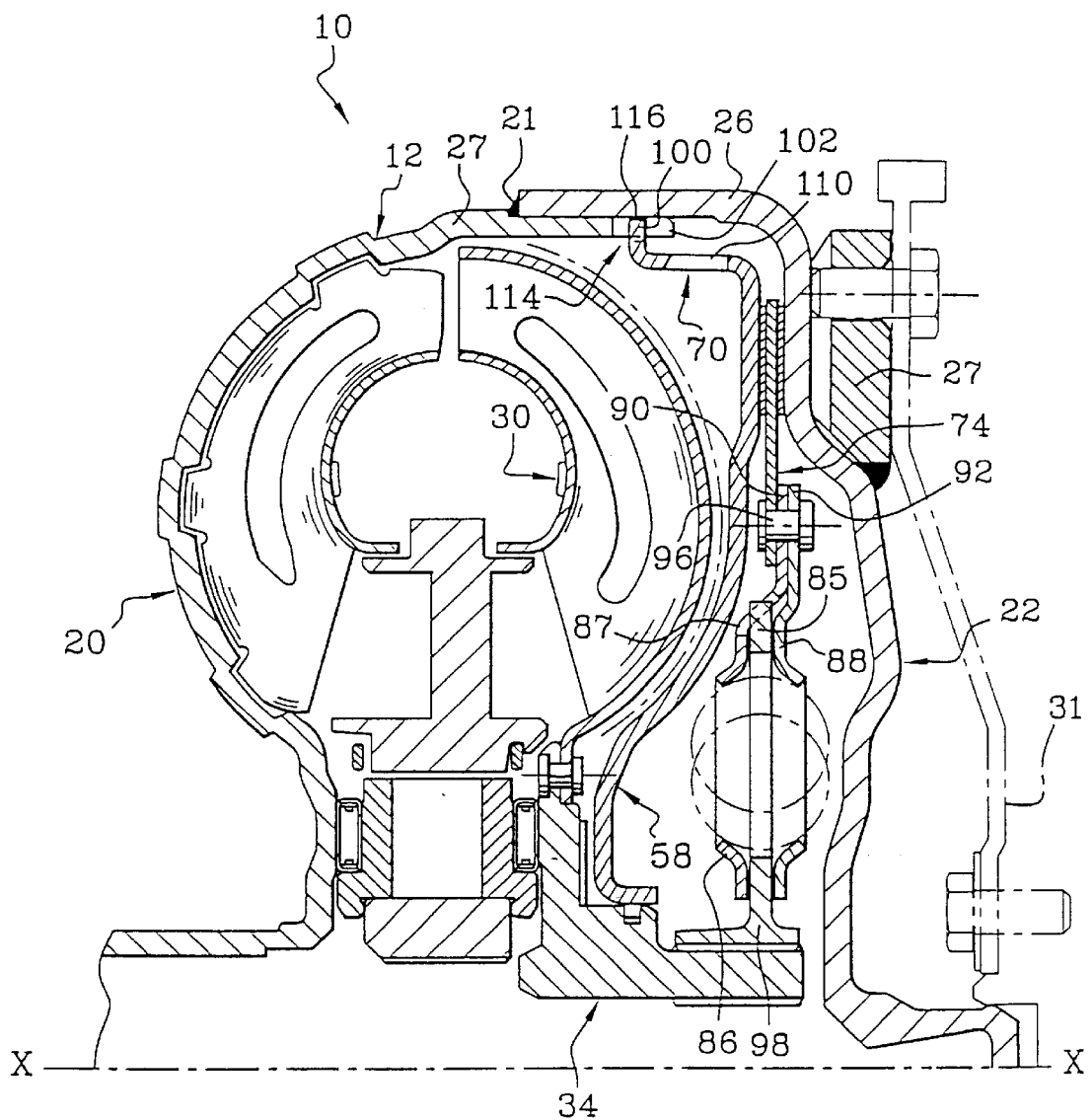

The embodiment shown in FIG. 3 differs from the foregoing versions, firstly in the form of the central damper plate 84 of the damper 78. It includes, at its outer periphery, lugs 85 which are received in notches 87 formed in the front guide ring 86 for the purpose of limiting the relative angular displacement of the guide rings 86 and 88, and therefore of the friction disc 74, with respect to the damper plate 84, given that in FIGS. 1 and 2, the displacement is limited by the interlocking of the turns of the springs 82.

It will also be seen in FIG. 3 that the sleeve portion 98 of the damper plate 84 extends on either side towards both the front and the rear with respect to the transverse plane of the damper plate 84.

The damper 78 is arranged radially slightly further out, and for this purpose the guide rings are bent forward to define the portions 90, 92 at their outer periphery so that they can follow the profile of the turbine wheel more closely, with the rivets 96 being located radially close to the friction liners 76.

As in the embodiment in FIG. 2, the outer periphery of the piston is S-shaped, with a radially oriented annular ring portion 114 which is divided into meshing lugs 100 that are received radially within complementary notches 102, the latter being in this example formed directly in the rear axial end portion of the front tubular portion 27, these notches being closed radially by the front tubular portion 26, which in this example is an external portion, that is to say the portion 27 is centred internally in the tubular portion 26. In this Figure, the radial plate 31, which couples the casing 12, 22, 24 in rotation to the driving shaft, will be seen.

The mesh between the casing 20, 27 of the impulse wheel increases the bending radius of the skirt portion and increases the dimension and radius of action of the friction liners.

The holes 110 are formed in the axial skirt portion 70.

Centring of the outer periphery of the piston 58 is obtained by cooperation of the annular cylindrical edge 116 of the lugs 100 of the ring portion 114 with the inner cylindrical surface, facing it, of the rear tubular portion 26, whereas in FIG. 2, there is a radial clearance between the annular ring portion 114 and the tubular portion 27.

Figure 4:
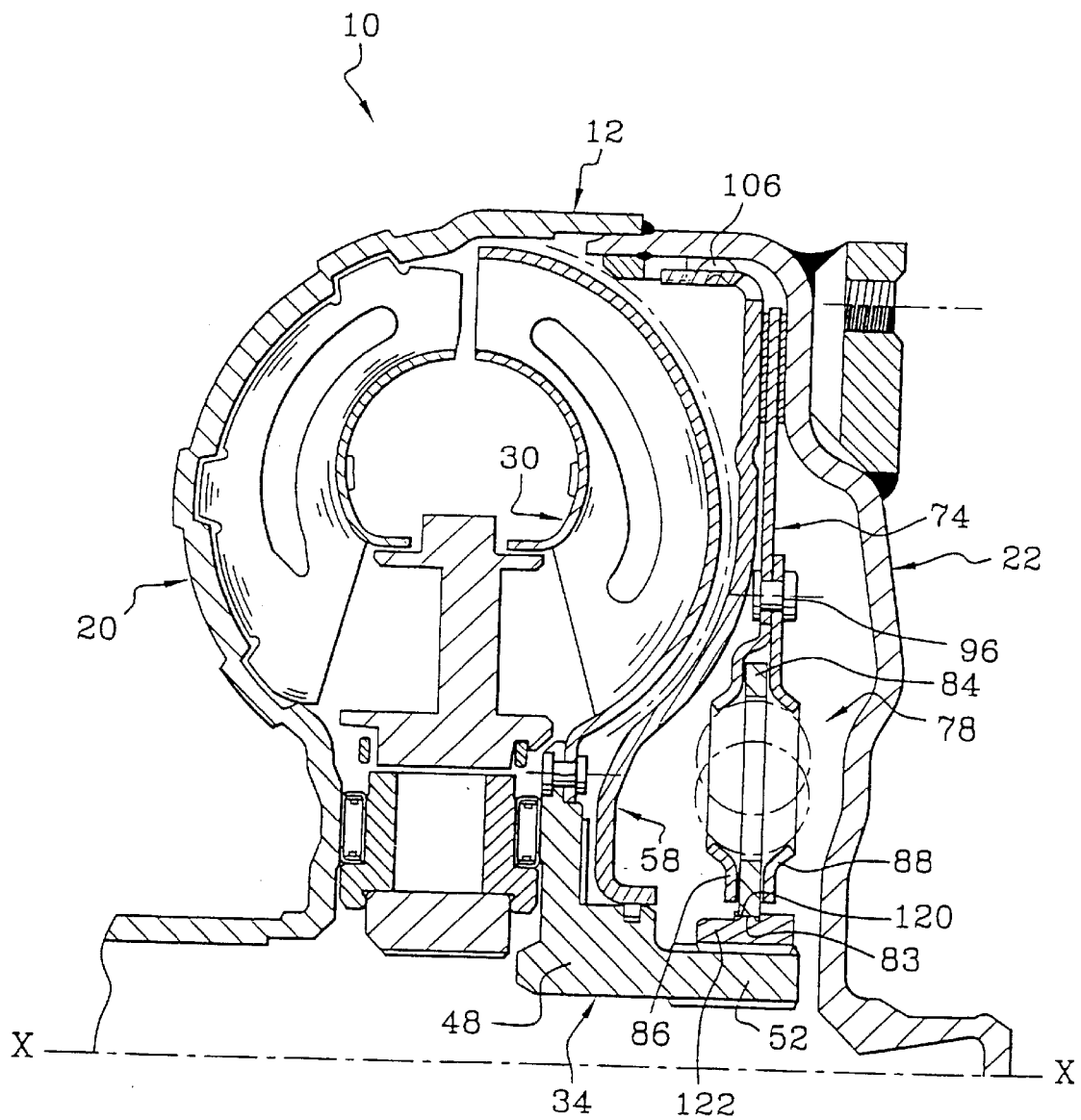

The embodiment shown in FIG. 4 differs from that in FIG. 1 in the design of the inner peripheral portion of the damper plate 84 and the means by which it is coupled to the hub 34.

The central hub 84 is in the form of a flat plate, with its radially inner circular edge 83, which is seamed axially on an outer cylindrical surface 120 of a central, internally splined, guide sleeve 122, with the splined rear portion 52 of the hub 34 of the turbine, along which the sleeve 32 is mounted for sliding movement, extending axially through the guide sleeve. The disc 74 is formed integrally with the guide ring 86, which reduces the size of the components and enables better riveting to be obtained at 96.

Figure 5:
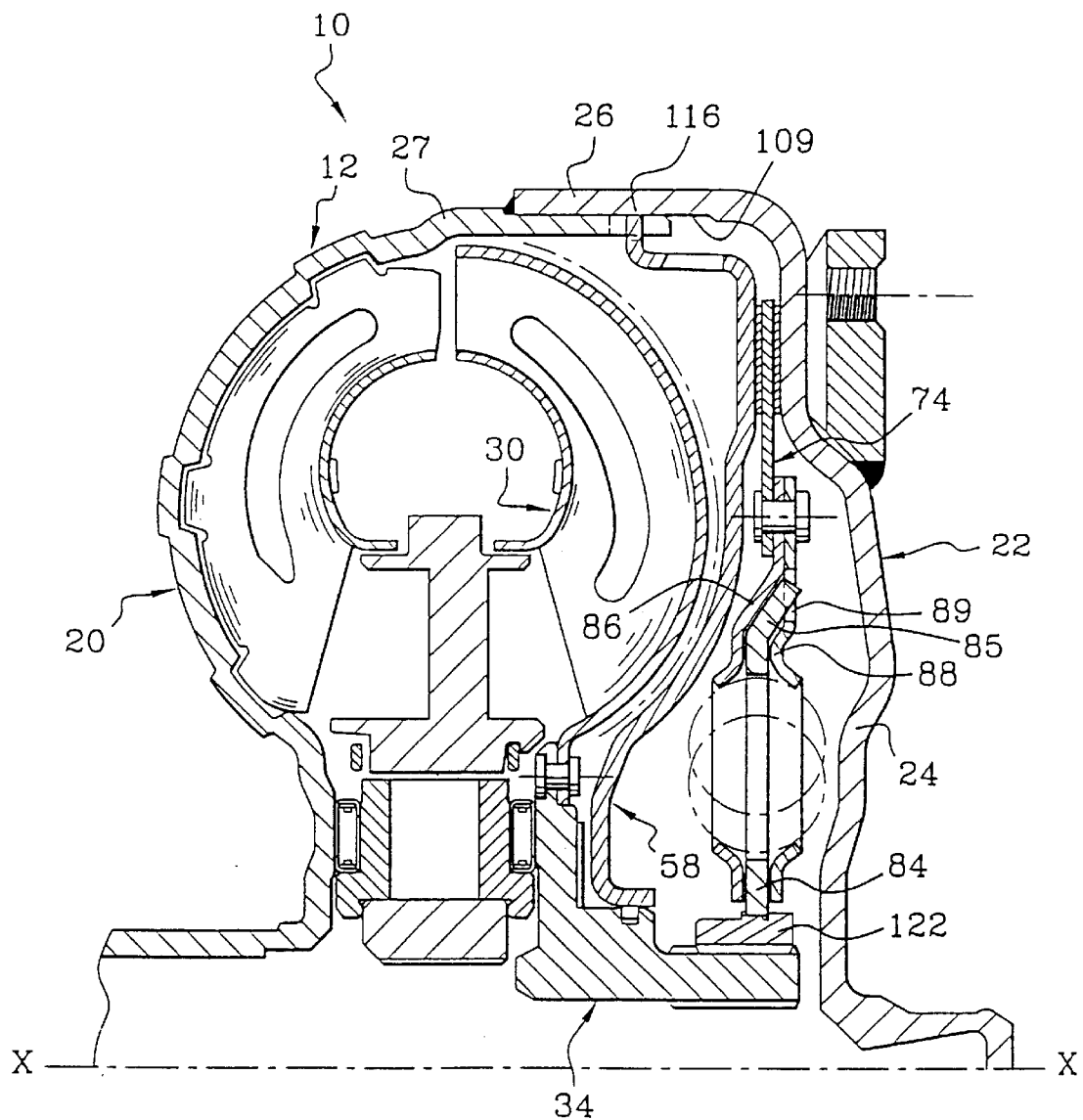

With reference to the embodiment shown in FIG. 5, the design of the piston 58 and casing 12, 22 is identical with that shown in FIG. 3, while the internal portion of the central damper plate 84 is similar to that of FIG. 4, with a splined sleeve 122.

By comparison with FIG. 3, the lugs 85 of the damper plate 84 are inclined axially rearward towards the transverse wall 24, and they are received in notches 89 in the form of holes in the outer periphery of the rear guide ring 88.

Figure 6:
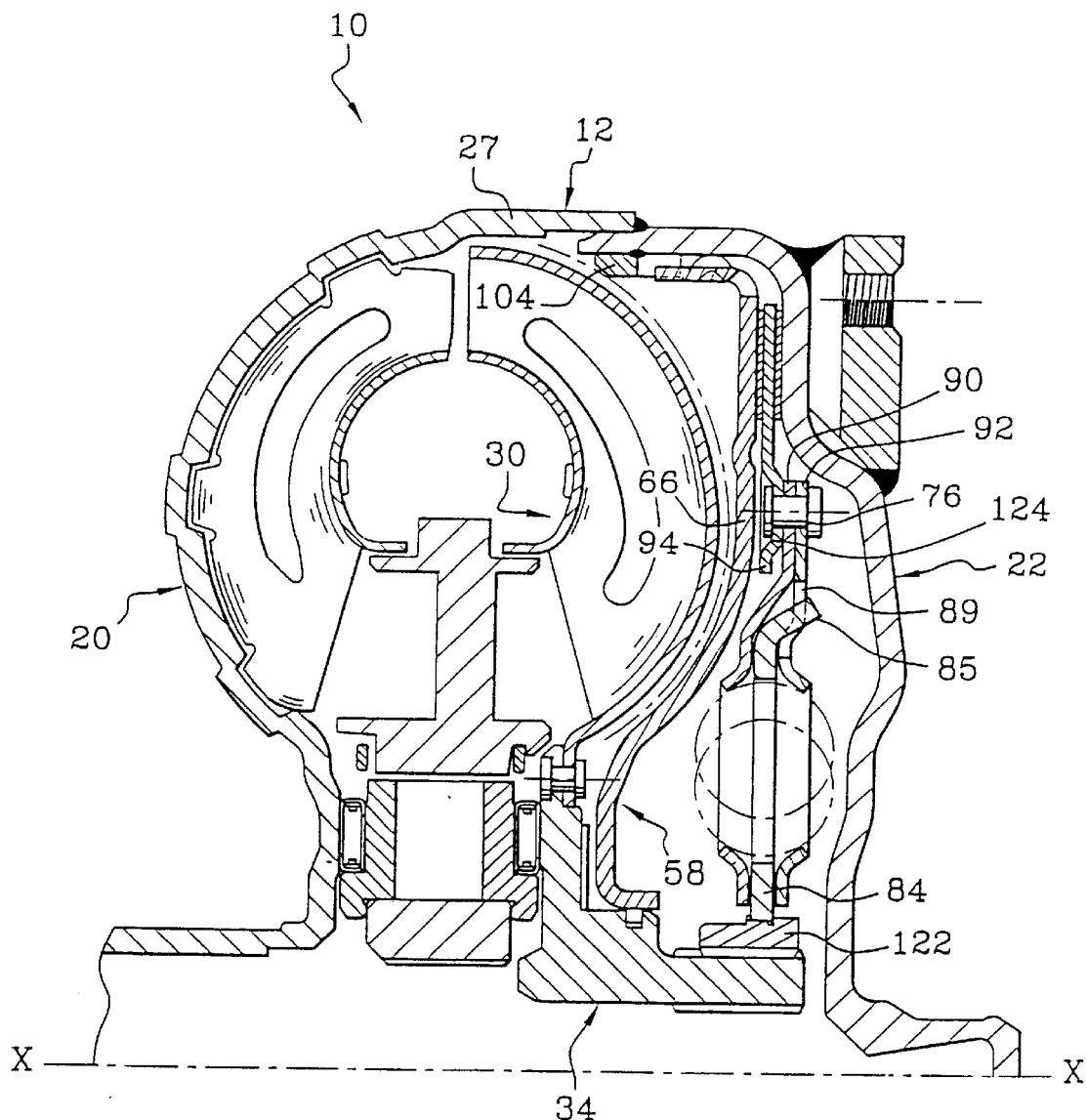

The embodiment shown in FIG. 6 is similar to that in FIG. 1 as regards the design of the piston 58 and casing 12.

As regards the design of the damper 78, the damper plate 84 and the means coupling it to the friction disc 74 are identical to those shown in FIG. 5, with the lugs 85 being inclined axially towards the rear by an even greater amount.

In order to give a further reduction in axial size of the apparatus 10 in the region of its outer periphery, and in order to align the damper plate 84 transversely with the annular friction disc 74, the inner radial periphery 94 of the disc 74, through which the rivets 96 pass, is formed with local press-formed dimples 124 which are offset axially towards the rear.

The detail shown in FIG. 7 represents another version of the piston 58 and casing 12, in which the outer periphery 70 of the piston 58 is in mesh with the rear tubular portion 26, but is not centred in the latter. The piston 58 is centred by the external surface of the hub 34 which is not shown.

The skirt portion 70 is therefore splined by deformation of its material so as to form splines 126 in relief that are received between the complementary splines 128 formed in the rear tubular portion 26 by deformation of the material of the thicker front portion of the latter.

In the embodiment shown in FIG. 8, the front axial end of the skirt portion 70 is divided into axial meshing lugs 100 which constitute tenons that are received in notches 102 constituting mortices in the tubular rear portion 26. More precisely, the notches are defined between lugs 130 which are formed by an operation of cutting out and bending back radially inwards in the axial front end portion of the tubular portion 26. The base 132, at the outer end of the notches, is concave and cylindrical so that it participates in the centring of the piston by means of the outer cylindrical surface 108 of the lugs 100.

The embodiment in FIG. 9 is a modified version of the foregoing, in which the lugs 130 are replaced by an attached annular ring 104 which has internal teeth and which is fixed, for example by welding, to the front axial end of the rear tubular portion 26.

In a further version not shown, the attached annular ring 102 is a starter crown, arranged in the manner described and shown in the document FR-A-2 735 846, the crown being disposed axially between the tubular portions 26 and 27.

The embodiment shown in FIG. 10 is similar to that in FIG. 3 as regards the centring and meshing of the piston 58. The peripheral portion 70 of the piston is a frusto-conical skirt with holes 110 for passage of oil. This conical design, in this case, also enables the diameter of the friction liners to be increased, and also that of the contact surface between the tenons 100 and mortices 102.

The embodiments shown in FIGS. 11 to 17 will now be described.

Figure 11:
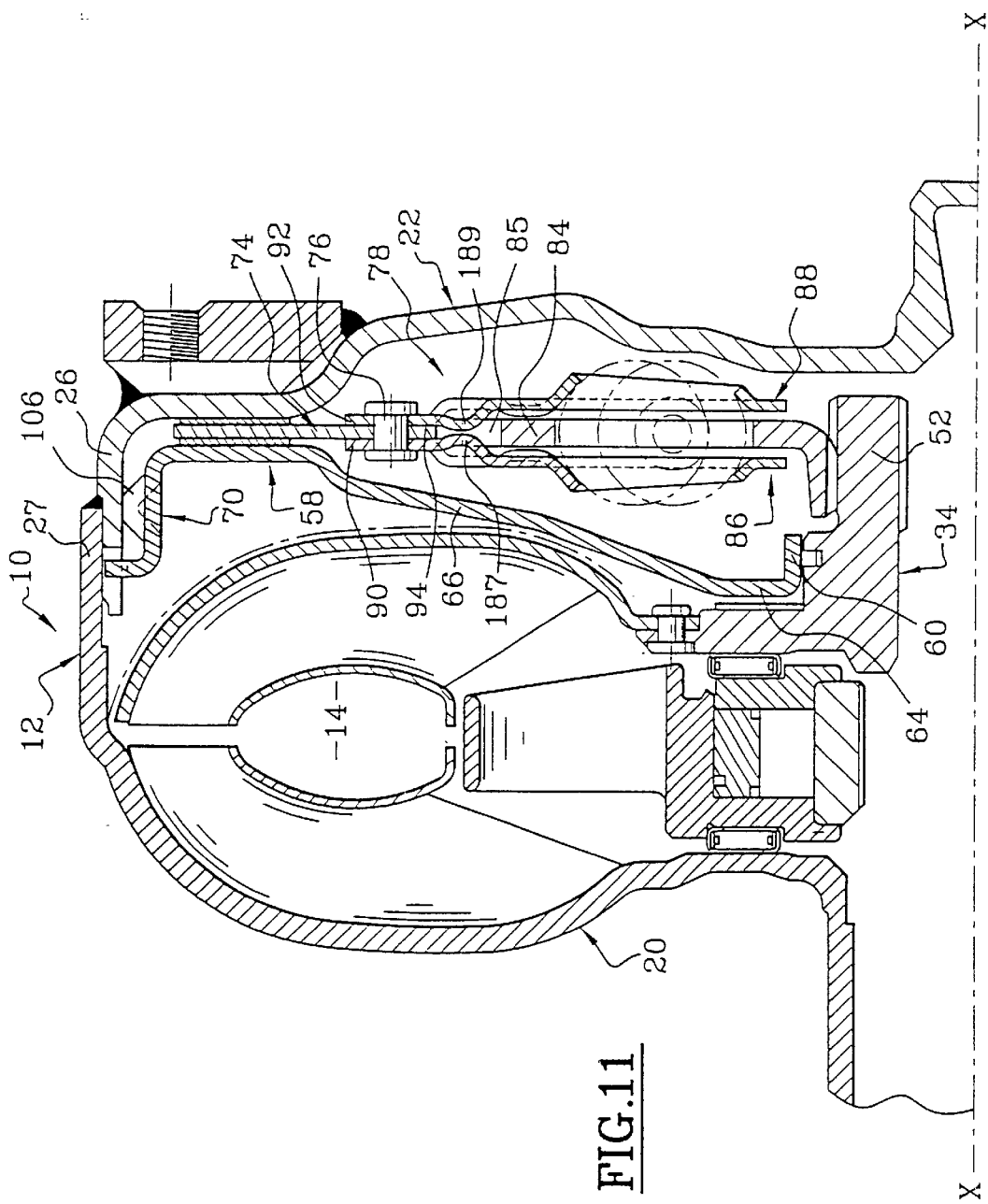
FIG. 11 is a view similar to that in FIG. 1, but shows another embodiment of the invention in an axially "slenderised" apparatus.

Comparing FIGS. 11 and 1, it is seen that the lock-up device is of the "slenderised" type, that is to say it is narrower in the axial direction and ovoid in cross section.

The intermediate first portion 66 of the piston 58 therefore has a configuration which is substantially flared and frusto-conical, while its outer peripheral portion is in all ways similar to that of the piston in FIG. 1, with its means for meshing and centring in the casing 12.

The friction disc 74 is arranged axially between the two guide rings 86 and 88, that is to say its radially inner periphery 94 is received between the annular rings 90 and 92 of the guide rings.

The outer periphery of the central damper plate 84 is divided into lugs 85 which lie in the transverse plane of the damper plate 84 and friction disc 74. The lugs 85 are received between axially oriented local dimples 187 and 189 which, from the functional point of view, are equivalent to the notches 87 and 89 shown in FIGS. 3 and 5, that is to say the cooperation of the lugs 85 with the dimples limits the angular displacement of the damper 78. The friction disc 74 is located axially between the lugs 90 and 92.

Figure 12:
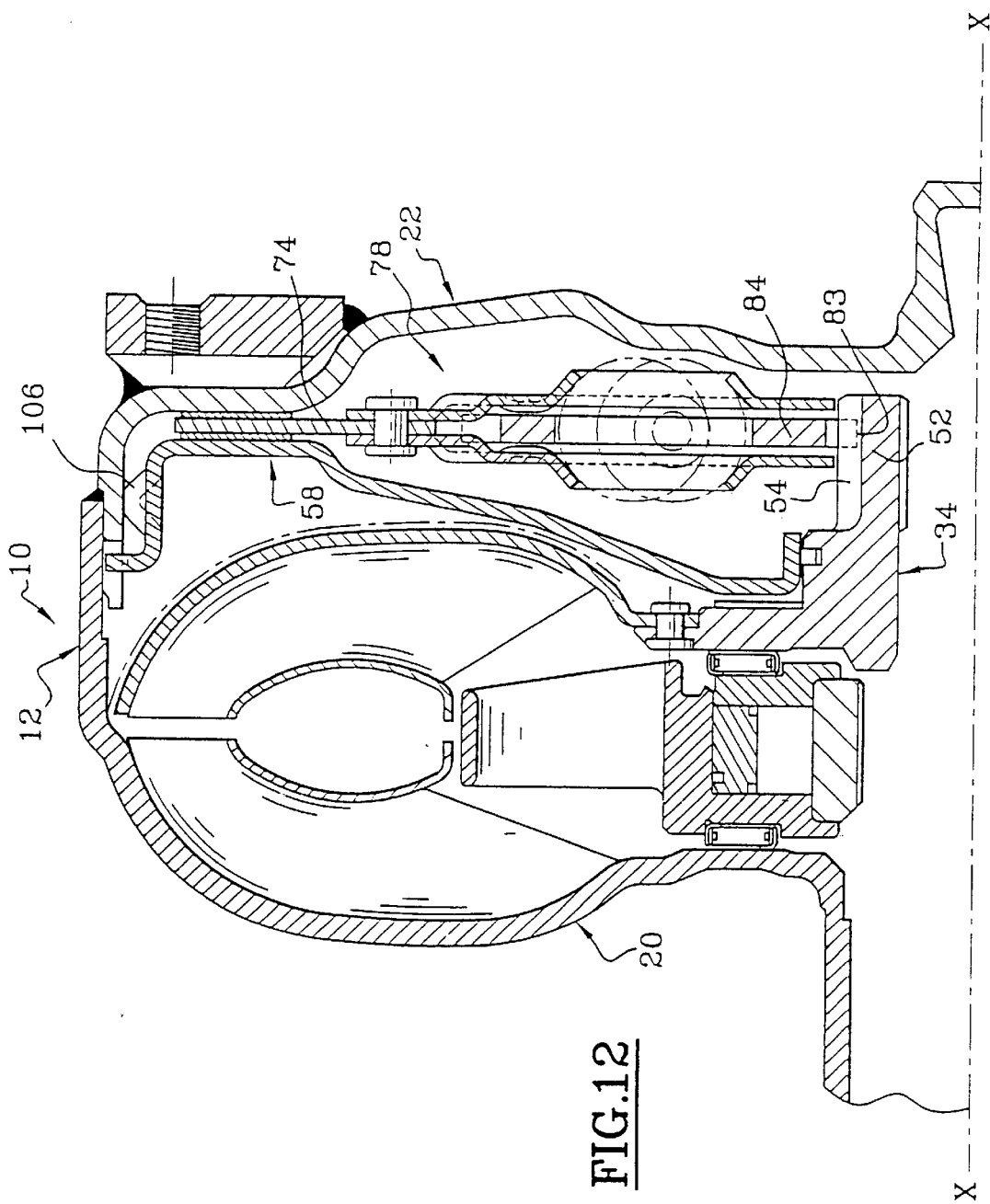
FIGS. 12 to 17 are views similar to that in FIG. 11, but show yet more versions of the apparatus in FIG. 11.

In the embodiment shown in FIG. 12, if this is compared with FIG. 11 the radially inner periphery of the central damper plate 84 does not include either kind of sleeve for guiding it along the portion 52 of the hub 34. Its radially inner circular surface 83 is splined, and the splines 54 of the hub 34, 52 extend directly through it.

Figure 13:
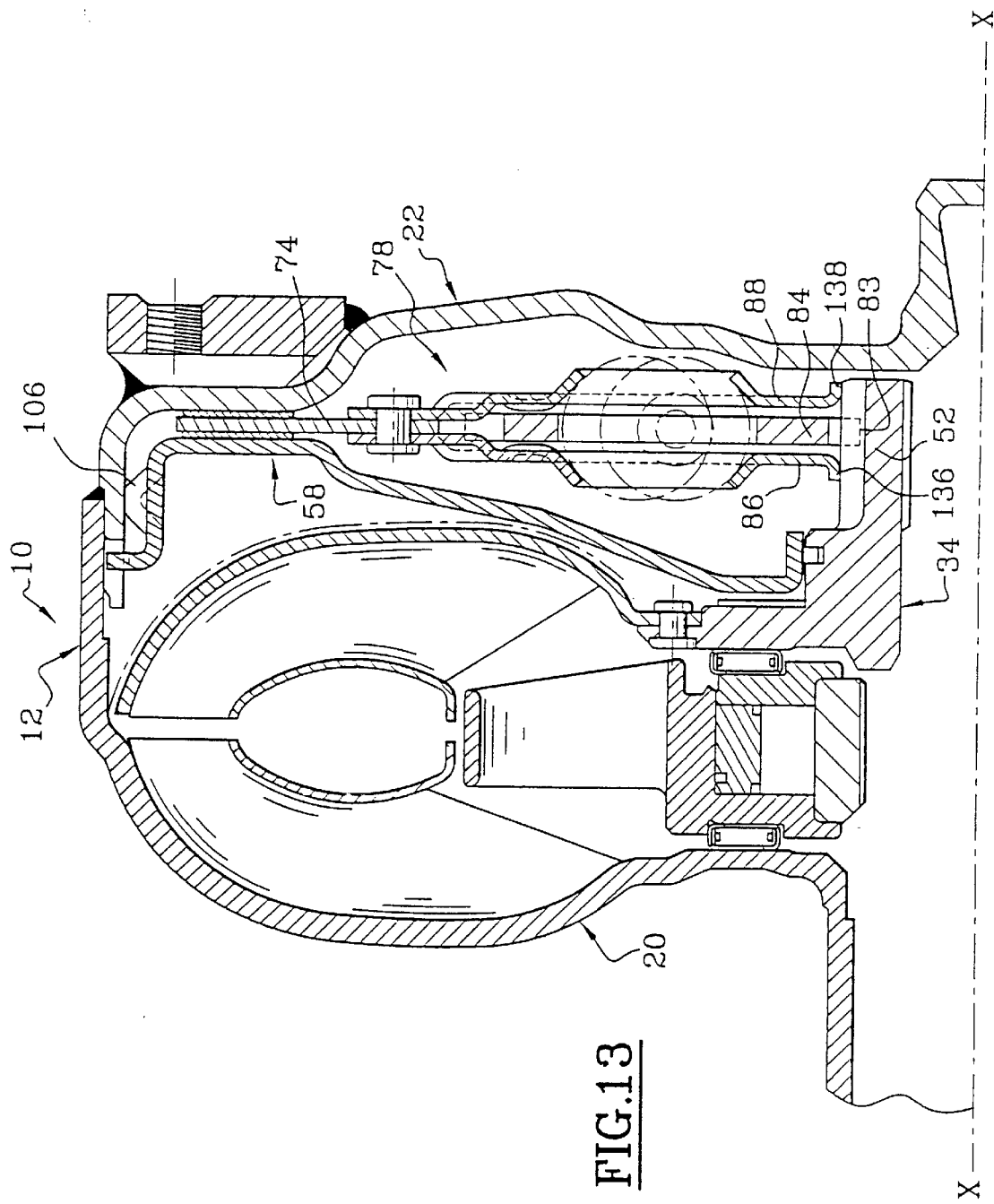

In order to improve the axial guiding of the damper 78 along the portion 52 of the hub 34, it is proposed in FIG. 13 to configure the inner peripheral portions 136 and 138 of the guide rings 86 and 88 in the form of guide sleeves.

Figure 14:
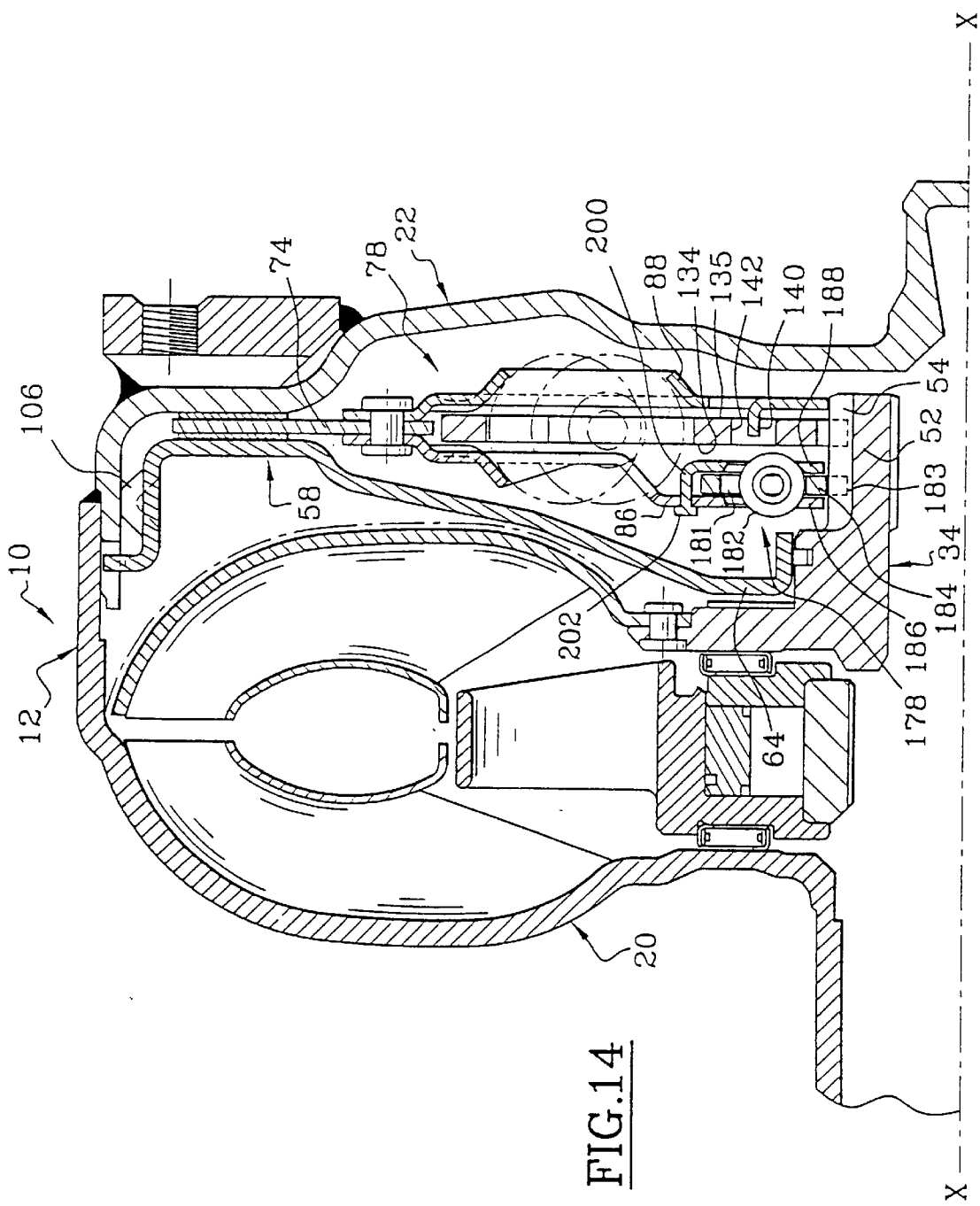

In the embodiment in FIG. 14, the apparatus includes a resilient predamper 178 which works between the hub 34 of the turbine wheel 30 of the main damper, so as to absorb vibrations in the idling mode of the heat engine of the vehicle.

The predamper 178 is of a generally similar design to that of the damper 78, with two guide rings, namely a front guide ring 186 and rear guide ring 188, for guiding circumferentially acting springs 182 that are received in windows 181 of a central damper plate 184 which meshes through its splined, radially inner circular edge 183, with the splines 54 of the hub 34, 52 which pass through it, the predamper 178 being in this example disposed axially between the piston 58, 64 and the damper 78.

In order to act circumferentially between the hub 34, 52, to which its central damper plate 184 is coupled in rotation, and the main damper 78, the front guide ring 186 of the predamper 178 consists of the radially inner portion of the front guide ring 86 of the damper 78, which for this purpose is deformed in such a way as to define an axial space between the guide ring 88 and the front transverse face 134 of the central damper plate 84.

The rear guide ring 188 is coupled in rotation and fixed axially to the front guide ring 186 by means of lugs 200, which are bent axially forward and which extend through corresponding holes of the front guide ring 186, with upset heads 202.

The stiffness of the springs 182 is of course substantially smaller than that of the springs 82.

In the embodiment shown in FIG. 14, the displacements of the central damper plate 84 with respect to the guide rings 86 and 88 of the damper 78 are caused by at least one lug 140 bent axially at right angles, and extending axially forward through a corresponding oblong hole 142 in the central damper plate 84, in which it is received with a circumferential clearance corresponding to the angular displacement of the resilient damper 78.

Figure 15:
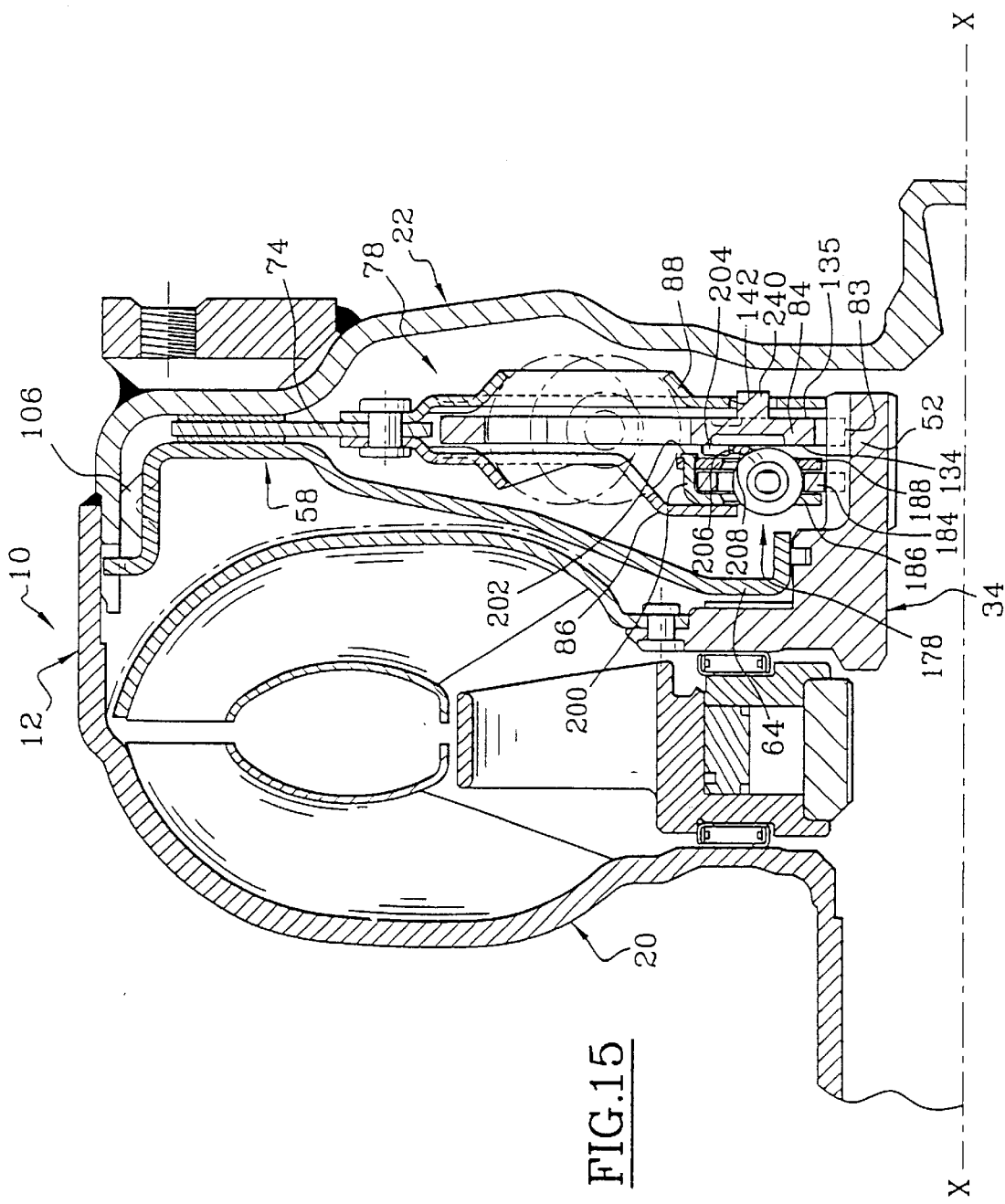

In the embodiment in FIG. 15, the predamper 178 is interposed axially between the radially inner peripheral portion of the front guide ring 86 of the main damper 78, which is deformed axially for this purpose towards the piston 58, 64, and the front transverse face 134 of the central damper plate 84 that faces it.

In this example, it is the rear guide ring 188 of the predamper 178 that is coupled in rotation to the central damper plate 84 of the main damper 78.

For this purpose, the front transverse face 134 includes at least one pad 204 which extends axially forward and is received in a complementary hole 206, or, in another version, in a notch, in a radial lug 208 of the rear guide ring 188.

The arrangement of the lugs 200 coupling together the two guide rings 186 and 188 is reversed as compared with that in FIG. 14, that is to say they are part of the front guide ring 186.

In order to limit the angular displacements of the damper plate 84 with respect to the guide rings 86 and 88, the rear transverse face 135 of the central damper plate 84 has at least one pad 240 which extends axially towards the rear so as to be received, with a circumferential clearance, in a complementary oblong hole 142 in the inner periphery of the rear guide ring 88.

Figure 16:
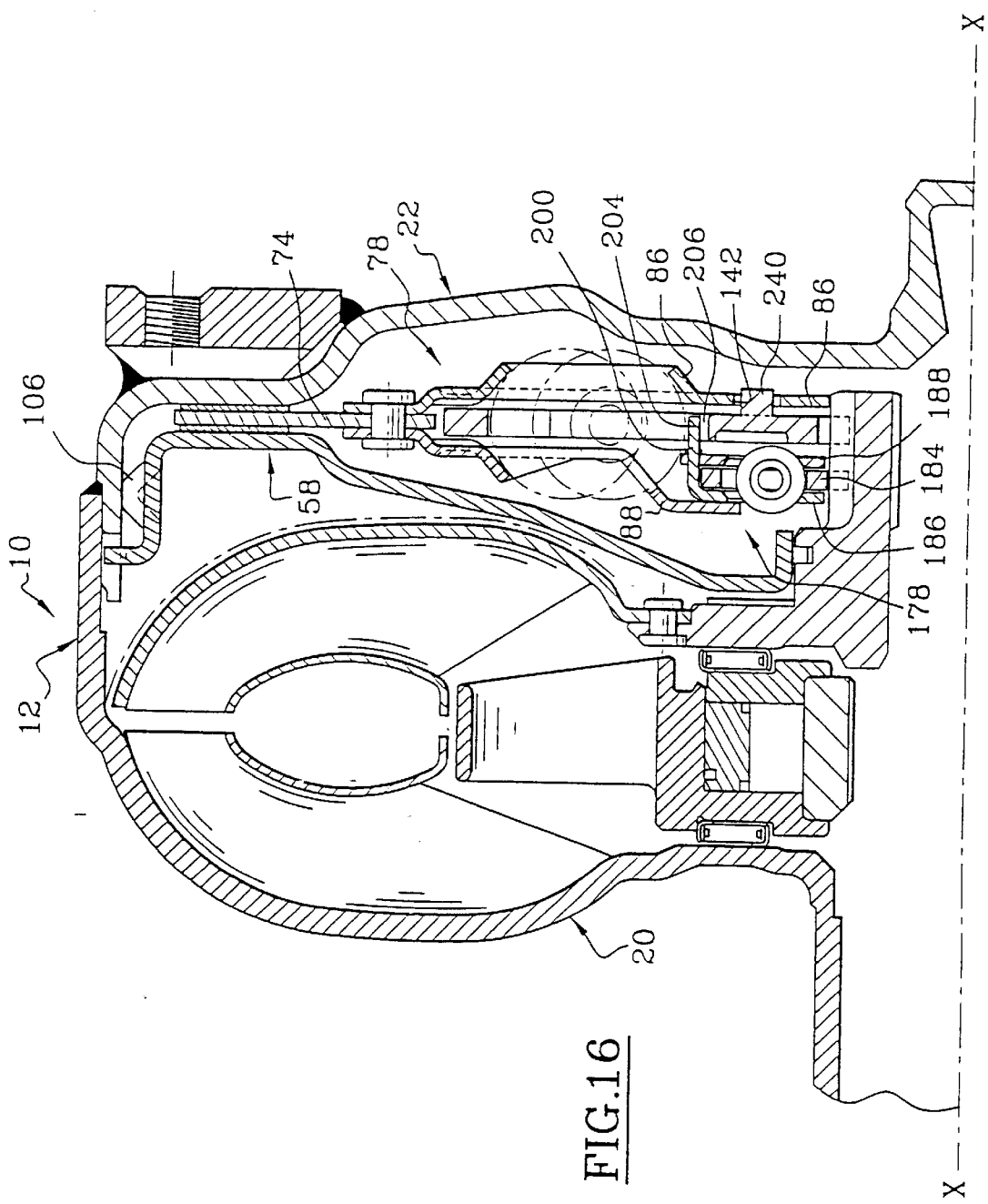

By contrast with FIG. 15, the embodiment shown in FIG. 16 shows yet another modified version of the means coupling the predamper 178 in rotation with the damper 78, in which the lugs 200 which extend through the rear guide ring 188 are extended axially by free rear end portions 204 so as to be received in corresponding holes 206 in the central damper plate 84.

Figure 17:
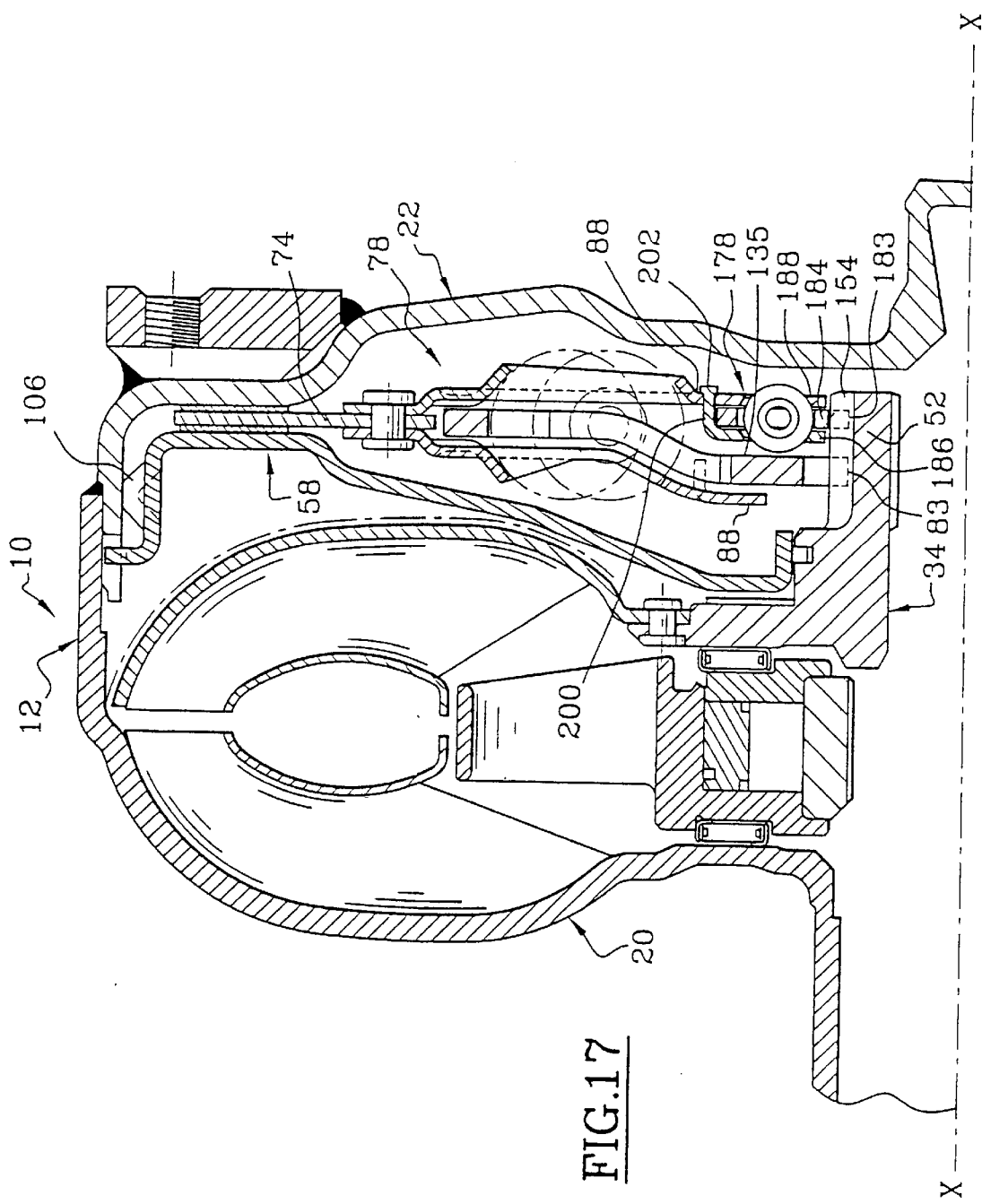

Finally, the embodiment of FIG. 17 is comparable with that in FIG. 14, with the position of the predamper being reversed geometrically with respect to the main damper 78, that is to say the predamper 178 is disposed axially between the damper 78 and the wall 24 of the casing 12, 22. More precisely the predamper 178 is interposed between the rear guide ring 88 and the rear transverse face 135 of the central damper plate 84, with the rear guide ring 188 being incorporated in the radially inner portion of the rear guide ring 88.

For driving the central damper plate 184 in rotation through its splined inner peripheral edge 83, the splined outer peripheral surface of the rear portion 52 of the hub 34 is stepped, with a rear axial end portion 154 of reduced diameter. The portion 54 is therefore double-stepped and splined in diameter.

Without departing from the scope of the invention, and by way of a complementary arrangement not shown, it is possible to provide hysteresis means working axially between the piston and the casing, in particular between the skirt portion 70 and the tubular wall 26, 27 in the region of the centring means of the outer periphery of the piston.

The operation of an apparatus according to the invention is conventional, and reference may in particular be made to the contents of the published documents mentioned earlier herein for further detail.

In all cases the piston 58, with the transverse wall 24, delimits a variable volume chamber. This chamber is delimited radially by the disc 74 and the friction liner or liners 76, together with the hub 34.

Variation of the pressure in this chamber displaces the piston 58 in one or other direction so as to lock or unlock the clutch.

The splines 56 can of course be made longer in the axial direction.

The disc 74 is in all cases axially flexible. In another version the disc 74 may be made of plastics material and the friction liner 76 may be made integral with the latter, so that the disc 74 is in every case adapted to be gripped axially by the piston 58 between, respectively, itself and the facing inner surface 73 of the transverse wall 24.

This is made possible because the disc 74 is flat.

The turbine and impulse wheels are associated here with a reaction wheel 34 so as to constitute a torque converter. In another version, the reaction wheel may be omitted.

What is claimed is:

1. A hydrokinetic coupling apparatus (10) comprising:
   a casing (12, 20, 22) having a generally radially oriented wall (24) and a radially outer peripheral portion (26, 102), the casing being adapted to be coupled in rotation to a drive shaft;
   a hub (34) adapted to be coupled in rotation to a driven shaft, the hub (34) having a splined rear portion (52, 54);
   a turbine wheel (30) coupled in rotation to the hub (34);
   a piston (58), in the form of a generally radially oriented annular ring movable axially and coupled in rotation to the casing, the piston (58) having a radially outer periphery and means (100) at the radially outer periphery for meshing with the radially outer periphery (26, 102) of the casing (22), the piston (58) further comprising a sleeve (60) mounted along the hub (34) for sliding movement; and
   a generally radially oriented annular friction disc (74) having a radially inner periphery (94), the generally radially oriented annular friction disc (74) adapted to be gripped axially by the piston (58) between, respectively, the piston and the facing inner surface (73) of the generally radially oriented wall (24) of the casing, the friction disc (74) comprising a damper plate (84) and being coupled at the radially inner periphery (94) to the hub (34) of the turbine wheel (30), said damper plate (84) having a radially inner periphery configured as a splined guide sleeve (98) through which the splined rear portion (52, 54) of the hub (34) extends,
   wherein the apparatus has a front and a rear, and further wherein the turbine wheel (30), the piston (58), the friction disc (74) and the radial wall (24) of the casing are arranged in axial succession from the front to the rear, and
   wherein the piston (58) includes, radially outward from the inside, an internal peripheral portion (64) and a bent first intermediate portion (66) which substantially follows an external profile (32, 36) of the hub and the turbine wheel.

2. An apparatus according to claim 1, wherein the turbine wheel (30) is coupled in rotation to a stepped hub (34), the stepped hub comprising a front portion (48) of larger diameter for guiding the radially inner periphery (60) of the piston (58), and a rear portion (52) of smaller diameter to which the radially inner periphery of the friction disc (74) is coupled in rotation.

3. An apparatus according to claim 2, wherein the hub (34) has a front portion (48) with an outer periphery (50), and further wherein the radially inner periphery of the piston (58) is configured as a sleeve (60) which is guided in sealed sliding movement along the outer periphery (50) of the front portion (48) of the hub (34) of the turbine (30).

4. An apparatus according to claim 2, wherein the radially inner periphery of the friction disc (74) is coupled rigidly to the hub (34) of the turbine.

5. An apparatus according to claim 2, wherein the friction disc (74) is coupled to the radially inner periphery of the hub (34) of the turbine, and wherein the apparatus further comprises a torsion damper (78) interposed between the friction disc (74) and the radially inner periphery of the hub (34) of the turbine.

6. An apparatus according to claim 5, wherein the friction disc (74) is in the form of a flat annular ring.

7. An apparatus according to claim 6, wherein the torsion damper (78) includes a damper plate (84) in the form of a flat annular ring, further wherein the damper plate has a radially inner periphery coupled to the hub of the turbine.

8. An apparatus according to claim 7, wherein the friction disc (74) and the damper plate (84) are substantially coplanar.

9. An apparatus according to claim 6, further comprising an internally splined central guide sleeve (122) through which the splined rear portion (52) of the hub of the turbine extends, wherein the radially inner periphery (83) of the damper plate (84) is coupled axially and in rotation to the internally splined central guide sleeve (122).

10. An apparatus according to claim 6, wherein the radially inner periphery (83) of the damper plate (84) is splined internally, and the splined rear portion (52, 54) of the hub (34) of the turbine is disposed within and slidingly engages said radially inner periphery (83) of the damper plate (84) to permit relative sliding movement there between.

11. An apparatus according to claim 5, wherein the torsion damper (78) is a main damper, and wherein the apparatus further includes a torsion predamper (178) interposed between the turbine hub (34) and the main damper (78).

12. An apparatus according to claim 11, wherein the torsion predamper is radially adjacent and close to the hub.

13. An apparatus according to claim 12, wherein the torsion predamper is disposed axially between the piston (58) and the main damper (78).

14. An apparatus according to claim 12, wherein the torsion predamper is disposed axially between the main damper (78) and the generally radially oriented wall (24), in facing relationship with the generally radially oriented wall (24), of the casing (22).

15. An apparatus according to claim 1, wherein the piston (58) includes an intermediate second portion (68) in the form of a radially oriented flat ring, the intermediate second portion having a rear annular face in facing relationship with a friction ring (76), and an outer peripheral skirt portion (70) in the form of a generally axially oriented skirt, the outer peripheral skirt portion including means for meshing the outer peripheral skirt portion (70) with the radially outer peripheral portion (26, 27, 20, 22) of the casing.

16. An apparatus according to claim 15, wherein the outer peripheral skirt portion (70) extends axially forward from the second intermediate portion (68).

17. An apparatus according to claim 15, wherein the outer peripheral skirt portion (70) is a tubular cylindrical skirt.

18. An apparatus according to claim 17, wherein the radially outer periphery (26, 27) of the casing with which the piston (58, 70) meshes is generally tubular and cylindrical.

19. An apparatus according to claim 18, wherein the radially outer periphery of the casing delimits an internal cylindrical centering surface (109) of the casing for centering the radially outer periphery (70, 108, 116) of the piston (58).

20. An apparatus according to claim 19, wherein the piston (58) has a generally radially oriented outer peripheral portion (114), the generally radially oriented outer peripheral portion having a cylindrical free edge (116) centered in the internal cylindrical centering surface (109) of the casing.

21. An apparatus according to claim 19, wherein the outer peripheral skirt portion (70) of the piston (58) includes a set of bosses (106) formed in relief, which extend radially outwards and are centered in the internal cylindrical centering surface (109) of the casing.

22. An apparatus according to claim 18, wherein the outer peripheral skirt portion (70) of the piston (58) has a set of lugs (100) or splines (186) spaced apart circumferentially and received in complementary notches (102) or splines (128) in the tubular radially outer periphery (26) of the casing.

23. An apparatus according to claim 22, wherein the casing (22, 26) includes an annular member (104) fixed internally in the casing, and further wherein the complementary notches or splines in the tubular radially outer periphery of the casing are formed in the annular member (104).

24. An apparatus according to claim 23, wherein the annular member (104) is a starter crown.

25. An apparatus according to claim 22, wherein the casing is made of two complementary half shells, the two complementary half shells including a front half shell (20) and a rear half shell (22), each of which includes a portion (27, 26) of the tubular radially outer periphery of the casing.

26. An apparatus according to claim 25, wherein the complementary notches or splines in the tubular radially outer periphery of the casing are formed in one of the two portions (26, 27) of the tubular radially outer periphery of the casing.

27. An apparatus according to claim 25, wherein an annular member (104) is fixed within one of the two portions (26, 27) of the tubular radially outer periphery of the casing.

28. An apparatus according to claim 15, wherein the outer peripheral skirt portion (70) is a frusto-conical skirt.

29. An apparatus according to claim 15, wherein the piston (58) has fluid passage holes (110).

30. An apparatus according to claim 29, wherein the piston has a bent junction zone (112) between the intermediate second portion (68) and the outer peripheral skirt portion (70), and wherein the fluid passage holes (110) are formed in the bent junction zone (112).

31. An apparatus according to claim 29, wherein the passage holes are formed in the outer peripheral skirt portion.

32. An apparatus according to claim 1, wherein the friction disc (74) has opposed transverse faces, each of the opposed transverse faces carrying a respective friction liner (76).

33. A hydrokinetic coupling apparatus (10) comprising:
a casing (12, 20, 22) having a generally radially oriented wall (24) and a radially outer peripheral portion (26, 102), the casing being adapted to be coupled in rotation to a drive shaft;
a hub (34) adapted to be coupled in rotation to a driven shaft, the hub (34) having a splined rear portion (52, 54);
a turbine wheel (30) coupled in rotation to the hub (34);
a piston (58), in the form of a generally radially oriented annular ring movable axially and coupled in rotation to the casing, the piston (58) having a radially outer periphery and means (100) at the radially outer periphery for meshing with the radially outer periphery (26, 102) of the casing (22), the piston (58) further comprising a sleeve (60) mounted along the hub (34) for sliding movement; and
a generally radially oriented annular friction disc (74) having a radially inner periphery (94) and being adapted to be gripped axially by the piston (58) between, respectively, the piston and the facing inner surface (73) of the radial wall (24) of the casing, the friction disc (74) comprising a damper plate (84) and being coupled at the radially inner periphery (94) to the hub (34) of the turbine wheel (30), said damper plate (84) having a radially inner periphery configured as a splined guide sleeve (98) through which a splined rear portion (52, 54) of the hub (34), along which the sleeve (60) is mounted for sliding movement, extends,
wherein the apparatus has a front and a rear, the turbine wheel (30), the piston (58), the friction disc (74) and the radial wall (24) of the casing being arranged in axial succession from the front to the rear, and
wherein the piston (58) includes, considered radially outward from the inside, an internal peripheral portion (64) and a bent first intermediate portion (66) which substantially follows an external profile (32, 36) of the hub and the turbine wheel, then an intermediate second portion (68) in the form of a radially oriented flat ring, the intermediate second portion having a rear annular face in facing relationship with a friction ring (76), and an outer peripheral skirt portion (70) in the form of a generally axially oriented skirt, the outer peripheral skirt portion including means for meshing the outer peripheral skirt portion (70) with the radially outer peripheral portion (26, 27, 20, 22) of the casing.

34. An apparatus according to claim 33, wherein the outer peripheral skirt portion (70) extends axially forward from the second intermediate portion (68).

35. An apparatus according to claim 33, wherein the outer peripheral skirt portion (70) is a tubular cylindrical skirt.

36. An apparatus according to claim 35, wherein the radially outer periphery (26, 27) of the casing with which the piston (58, 70) meshes is generally tubular and cylindrical.

37. An apparatus according to claim 36, wherein the radially outer periphery of the casing delimits an internal cylindrical centering surface (109) of the casing for centering the radially outer periphery (70, 108, 116) of the piston (58).

38. An apparatus according to claim 37, wherein the piston (58) has a generally radially oriented outer peripheral portion (114), the generally radially oriented outer peripheral portion having a cylindrical free edge (116) centered in the internal cylindrical centering surface (109) of the casing.

39. An apparatus according to claim 37, wherein the outer peripheral skirt portion (70) of the piston (58) includes a set of bosses (106) formed in relief, which extend radially outwards and are centered in the internal cylindrical centering surface (109) of the casing.

40. An apparatus according to claim 36, wherein the outer peripheral skirt portion (70) of the piston (58) has a set of lugs (100) or splines (186) spaced apart circumferentially and received in complementary notches (102) or splines (128) in the tubular radially outer periphery (26) of the casing.

41. An apparatus according to claim 40, wherein the casing (22, 26) includes an annular member (104) fixed internally in the casing, and further wherein the complementary notches or splines in the tubular radially outer periphery of the casing are formed in the annular member (104).

42. An apparatus according to claim 41, wherein the annular member (104) is a starter crown.

43. An apparatus according to claim 40, wherein the casing is made of two complementary half shells, the two complementary half shells including a front half shell (20) and a rear half shell (22), each of which includes a portion (27, 26) of the tubular radially outer periphery of the casing.

44. An apparatus according to claim 43, wherein the complementary notches or splines in the tubular radially outer periphery of the casing are formed in one of the two portions (26, 27) of the tubular radially outer periphery of the casing.

45. An apparatus according to claim 43, wherein an annular member (104) is fixed within one of the two portions (26, 27) of the tubular radially outer periphery of the casing.

46. An apparatus according to claim 33, wherein the outer peripheral skirt portion (70) is a frusto-conical skirt.

47. An apparatus according to claim 33, wherein the piston (58) has fluid passage holes (110).

48. An apparatus according to claim 47, wherein the piston has a bent junction zone (112) between the intermediate second portion (68) and the outer peripheral skirt portion (70), and wherein the fluid passage holes (110) are formed in the bent junction zone (112).

49. An apparatus according to claim 47, wherein the passage holes are formed in the outer peripheral skirt portion.

\* \* \* \* \*